United States Patent [19]
Gordon

[11] 3,893,530
[45] July 8, 1975

[54] FLOOR TREATING MACHINES
[75] Inventor: Sidney Gordon, Stanmore, England
[73] Assignee: R. G. Dixon & Company Limited, Wembley, England
[22] Filed: Sept. 10, 1973
[21] Appl. No.: 395,551

[30] Foreign Application Priority Data
Sept. 12, 1972 United Kingdom............. 42345/72

[52] U.S. Cl................................ 180/6.5; 180/19 H
[51] Int. Cl...................... B62d 11/04; B62d 51/04
[58] Field of Search.............. 180/6.5, 19 H, 77 H

[56] References Cited
UNITED STATES PATENTS
| | | | |
|---|---|---|---|
| 644,853 | 3/1900 | Fahl | 180/6.5 X |
| 2,391,881 | 1/1946 | Clay | 180/77 H |
| 3,340,941 | 9/1967 | Neu | 180/6.5 |
| 3,563,327 | 2/1971 | Mier | 180/6.5 R |

Primary Examiner—David Schonberg
Assistant Examiner—John A. Pekar
Attorney, Agent, or Firm—Barlow & Barlow

[57] ABSTRACT

A floor treating machine comprising a pair of driving wheels with independent speed control, a pair of independently movable manually operable control members mounted side-by-side on the machine, with each of such control members being operably connected to an individual electrical component forming part of the speed control for one of the driving wheels, whereby synchronised movement of the control members provides equal adjustment of the wheel speeds, whereas differential movement of the control members provide a steering effect.

2 Claims, 4 Drawing Figures

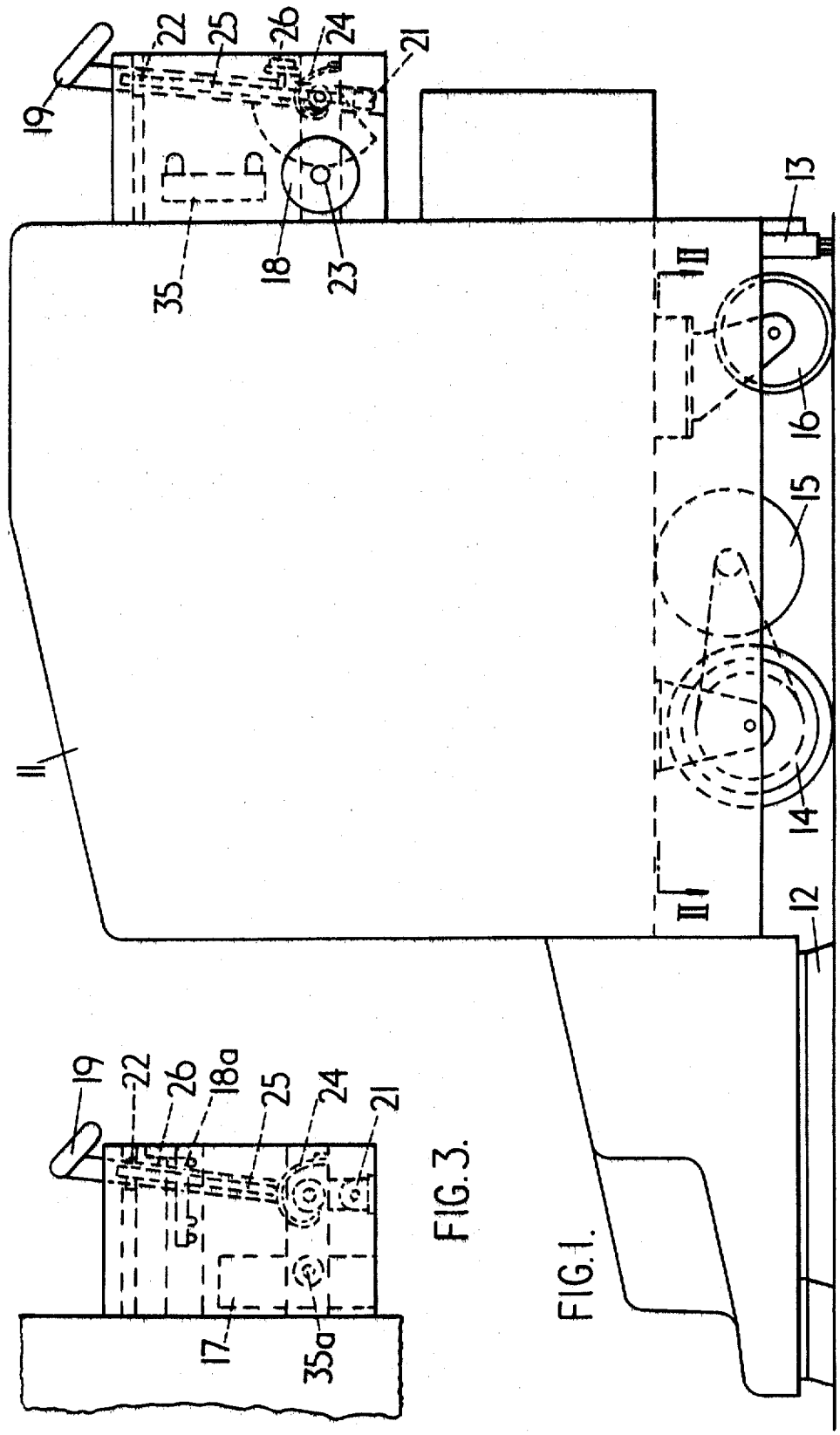

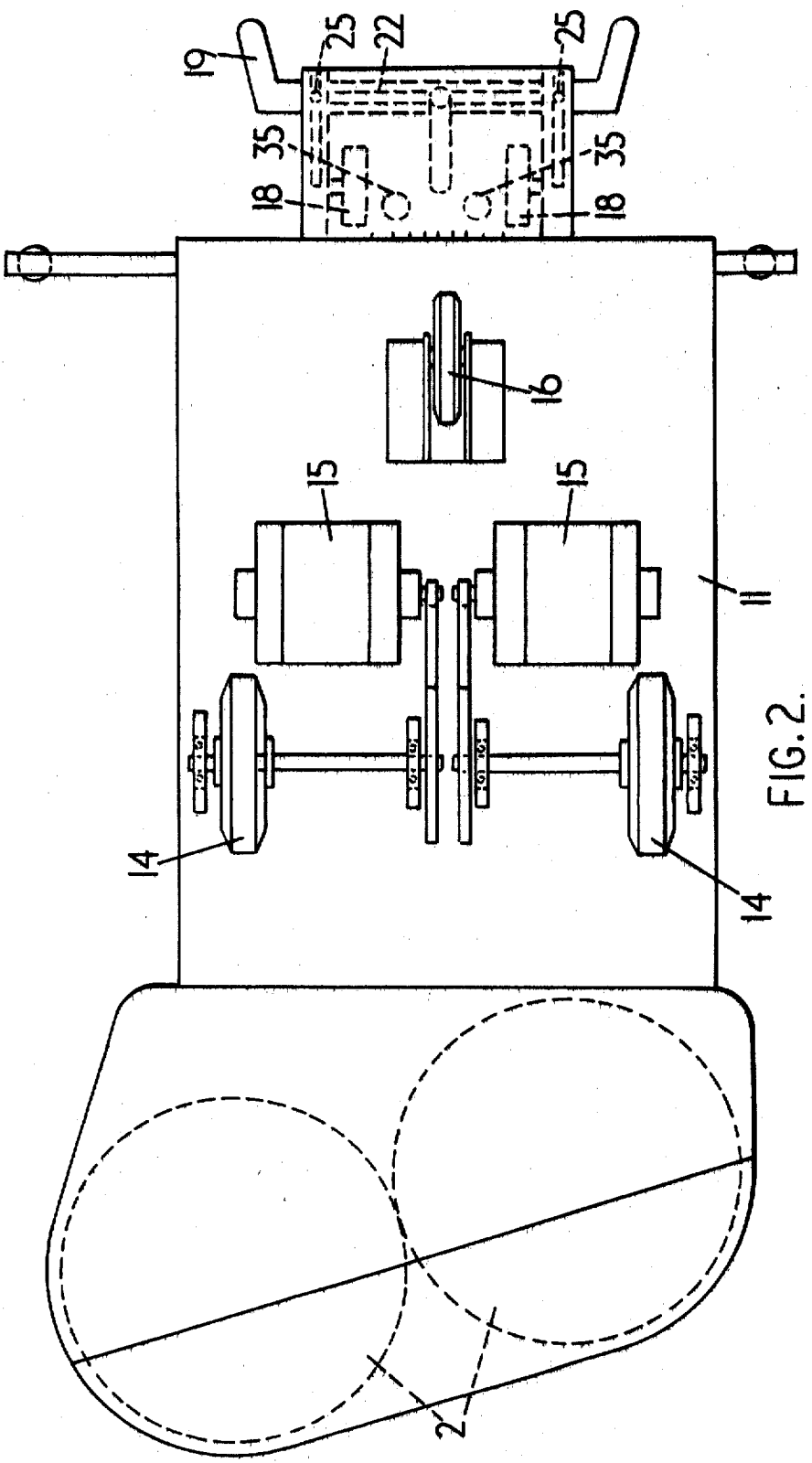

FLOOR TREATING MACHINES

This invention relates to floor treating machines.

Large floor treating machines, e.g. those for use in large factory areas, are very heavy to operate and frequently need to be power driven as well as power operated. In view of the request for mobility over a large area, recourse is frequently had to automatic machines, particularly battery powered.

In order to provide for driving and steering of such machines, a pair of power driven wheels, one at each side, may have independently controlled motors so that differential driving provides for steering.

The present invention particularly relates to the improved control of such a driving arrangement.

According to the invention, there is provided a floor treating machine comprising a pair of driving wheels with independent speed control, a pair of independently movable manually operable control members mounted side-by-side on the machine, with each of such control members being operably connected to an individual electrical component forming part of the speed control for one of the driving wheels, whereby synchronised movement of the control members provides equal adjustment of the wheel speeds, whereas differential movement of the control members provide a steering effect.

Preferably, the pair of control members are operable by a common handle which is adapted to provide conjoint or differential movement of the control members.

Preferably, also each of the control members is pivoted and drivably connected to a rotary or slidable electrical components such as a potentiometer.

The control members may be spring loaded to an off position.

The control members may also be adapted to operate reversing switches when moved in an opposite direction from the "off" position.

The electrical component may be used for directly controlling the motor current. Alternately and preferably, the electrical component provides a control in an amplifying circuit controlling the motor current.

The invention will be further described with reference to the accompanying drawings, in which:

FIG. 1 is a diagrammatic side elevation of one form of cleaning machine constituting a preferred embodiment of the present invention;

FIG. 2 is a plan view of the invention partly in diagrammatic section on the line II—II of FIG. 1;

FIG. 3 is a view similar to part of FIG. 1 showing a modified form of the invention.

Figure 4:
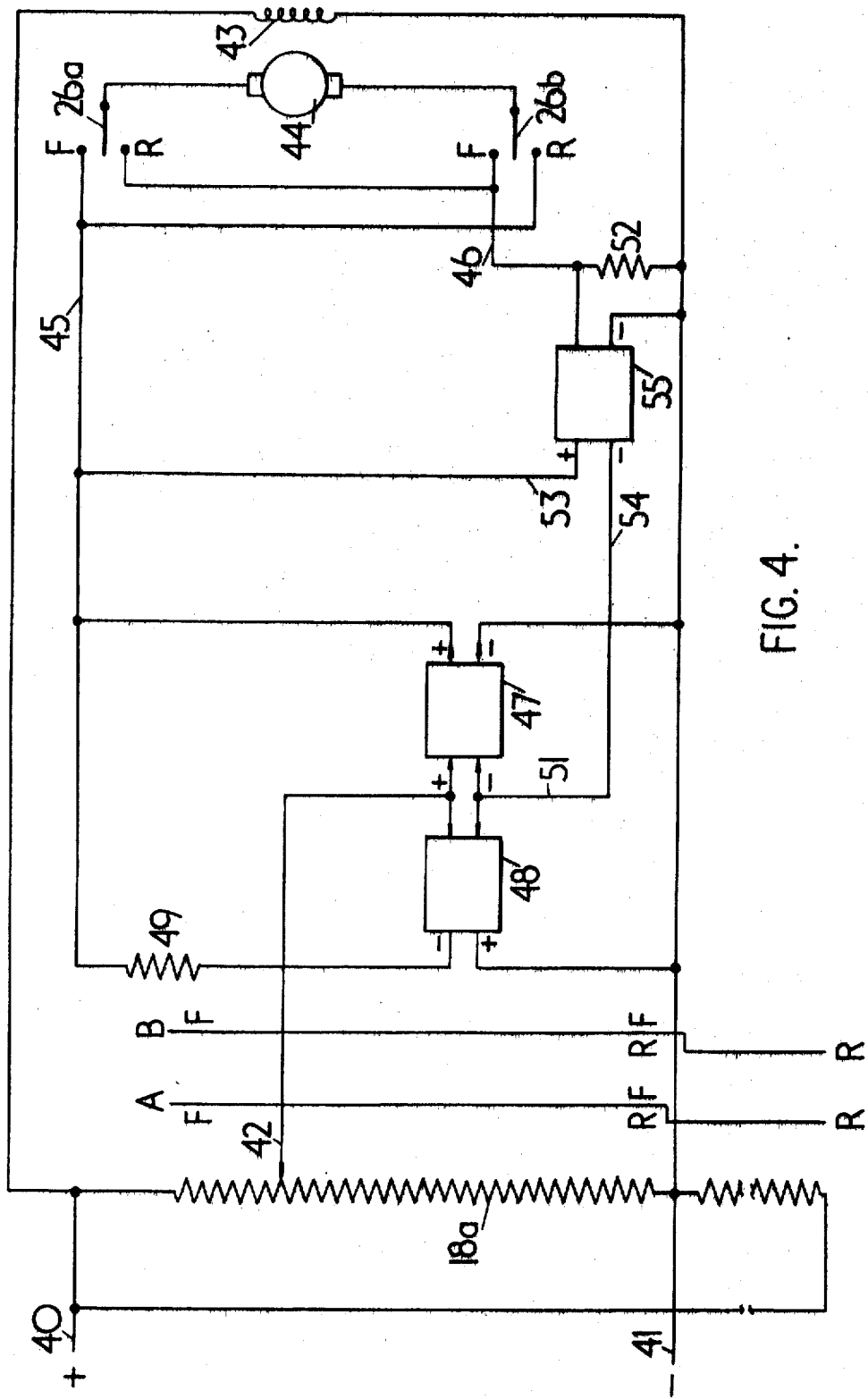
FIG. 4 is a circuit diagram showing a preferred control circuit.

Referring first to FIGS. 1 and 2, there is shown a floor treating machine comprising a body 11 containing storage tanks, pipework and a battery for providing power to operate and drive the machine. Forward of the body 11 are a pair of brushes 12, and to the rear is a suction nozzle 13. The body is mounted on a pair of drivable wheels 14, each of which has an associated motor 15, and a single castor wheel 16. Two castor wheels 16 may be used if desired. Control of the motor speed is obtained by a pair of rotary potentiometers 18 in the motor circuitry.

The potentiometers 18 are controlled by a tiller or swivel type handle 19, guided from fore and aft movement and mounted on a swivel coupling 21. The handle 19 is connected to a cross member 22 linked to a pair of arms 25 each carrying a gear drive 23 to one potentiometer 18. Each arm 25 is biased to an off position by a spring 24. The arrangement is such that when the handle 19 is pushed forward without swivelling, the potentiometers are adjusted conjointly to increase the motor speeds. If the handle 19 is swivelled there is a differential action of the arms 25 and potentiometers 18 which gives a steering control. On release of the handle 19 it will be returned to the off position by the springs 24 acting on the arms 25. In the off position electromagnetic braking is applied to both motors. When the handle 19 is pulled back from the off and braked position, reversing switches (not shown in FIGS. 1 and 2) are operated to put the motors in reverse and bring a pair of fixed resistors 35 into circuit to ensure reversing is at a preset speed.

The potentiometers 18 so far described are intended for direct control of the heavy motor current and consequently are comparatively large components. If it is desired to reduce the current carried by the adjustable components, i.e., the potentiometers, then small potentiometers may be used to control the current via an amplifying control circuit.

FIG. 3 shows a modification of part of FIG. 1, and indicates how the gear drives 23 may be dispensed with and the arms 25 connected directly to small linear slide potentiometers 18a controlling an amplifying control circuit generally illustrated at 17. This figure also shows a position for a reversing switch 26. The fixed resistor 35 is omitted and speed in reverse is controlled by the potentiometer 18a.

FIG. 4 is a circuit diagram illustrating a version of the machine in which each motor is controlled by an amplifying circuit influenced by the potentiometer 18a. The circuit for each motor is the same, so only one need be described. The positive and return terminals 40 and 41 are connected via a switch, not shown, to the battery on the machine, e.g. to give 36 volts across the terminals 40, 41. The potentiometer 18a is connected at both ends to the terminal 40 and has a centre tap to the terminal 41. This coincides with the off position of the slider 42 and arms 25.

A shunt field winding 43 for the motor is shown as directly connected between the terminals 40 and 41, and the motor armature is indicated generally at 44, and has the current through it controlled by the circuitry to be described hereinafter and the plurality controlled by reversing switches 26a and 26b. The reversing switches 26a and 26b are controlled by a cam operated by the arm 25 so that their operation is coordinated with the movement of the slider 42. It is indicated diagrammatically in the drawing how the switch 26a is switched from the forward F to the reverse R position just prior to the slider 42 reaching the off position, and the switch 26b goes into reverse just after this position. It will thus be seen that when the slider 42 is in the off position, the armature 44 is short circuited through the switches 26a and 26b, with the result that it provides the maximum dynamic braking in this position. Apart from this, the operation of the switches is fairly self-explanatory in that they control the direction of the current through the armature by selectively switching an output line 45 from the control circuitry and a return line 46 to the terminal 41.

The control of the motor speed is achieved by a pair of differential high gain power amplifiers 47 and 48 with common inputs. The amplifier 47 is conductive when there is a positive input to provide current for the armature, whereas the amplifier 48 is conductive in the opposite direction when there is a negative input to provide a low resistance dynamic braking circuit, including a resistor 49, to slow the motor down should it be overspeeding.

The first input to the amplifiers 47, 48 is the output signal from the potentiometer 18a picked-up by the slider 42, and this provides a reference signal against which a speed signal in a line 51 is compared. Should the speed signal on the line 51 exceed the reference signal from the slider 42, then the amplifier 48 provides dynamic braking, whereas if the speed signal is less than the signal provided by the slider 42, then the amplifier 47 provides current for the motor until the speed signal increases to the reference level.

In practice, the amplifier 47 will be providing pulses to maintain the motor at or near its required speed, and the amplifier 48 will only come into action when the motor is to be slowed down, either for steering or for slowing the machine bodily.

The speed signal in the line 51 is a voltage signal effectively equal to the back emf E generated by the armature 44. It will be appreciated that in the line 45 the voltage $V$ equals $E + IR$ where $I$ is the current through the armature 44 and R is the total resistance between the line 45 and the return terminal 41. In order to eliminate the term $IR$, there is provided a voltage amplifier which has an input from the line 46 equal to $Ir$, where $r$ is the resistance of a fixed resistor 52. This voltage amplifier is given a gain equal to $R/r$, so that the voltage across its output terminals 53 and 54 is $IR$, and by connecting the terminal 53 to the line 45, the terminal 54 will have an output voltage equal to $E$. This is the required speed signal.

It will thus been seen that in forward motion, i.e., the position illustrated, the switches 26a and 26b will be in the F position and the slider 42 will be in the upper half of the potentiometer 18a. When the speed signal E falls below the signal from the slider 42, then current will be supplied to the motor to increase the signal $E$ to that level. When the signal $E$ exceeds the reference level, then dynamic braking will be supplied. On returning the arm and slider to the neutral or off position, the dynamic braking through the resistor 49 will apply until the off position is reached, when complete short circuiting of the armature 44 will be provided by the switches 26a and 26b. On passing through the off position to the reverse position, the slider 42 will apply a steadily increasing signal, and the switches 26a and 26b will both be in the R positions so that the circuitry will operate exactly as in the forward mode except that the current will be supplied in the opposite direction to the armature.

Various modifications made be made within the scope of the invention.

I claim:

1. A floor treating machine comprising a body, a floor engaging rotary brush mounted for rotation on said body, a pair of laterally spaced driving wheels mounted on said body, electric motor means for driving the wheels, independent speed control means for each of the driving wheels, a pair of independently movable, manually operable control arms pivotally mounted in a swivel joint at one end thereof to move on parallel axes side-by-side on the machine, spring means loading each of the control arms to an off position, an individual electrical voltage control component mechanically and drivably connected to each of the control arms, each of the electrical control components forming part of the speed control means for a separate one of the said driving wheels, a common handle operatively connected between each of the control arms at a point removed from the pivotal mounting to give either conjoint synchronised movement or differential movement thereof, whereby synchronised movement of the control member provides equal adjustment of the wheel speeds and differential movement of the control members provides differential adjustment of the wheel speeds to give a steering effect and reversing switch means for the motor means located adjacent each control arm with each control arm being arranged to operate the reversing switch means when moved in an opposite direction from the off position.

2. A floor treating machine as claimed in claim 1, comprising amplifying current control means controlling the current to the motor means, the said electrical components constituting control elements for said amplifying current control means.

* * * * *